Dec. 12, 1950 G. H. SPENCE 2,533,745
ATTACHMENT FOR LAWN MOWERS
Filed Nov. 5, 1948 2 Sheets-Sheet 2
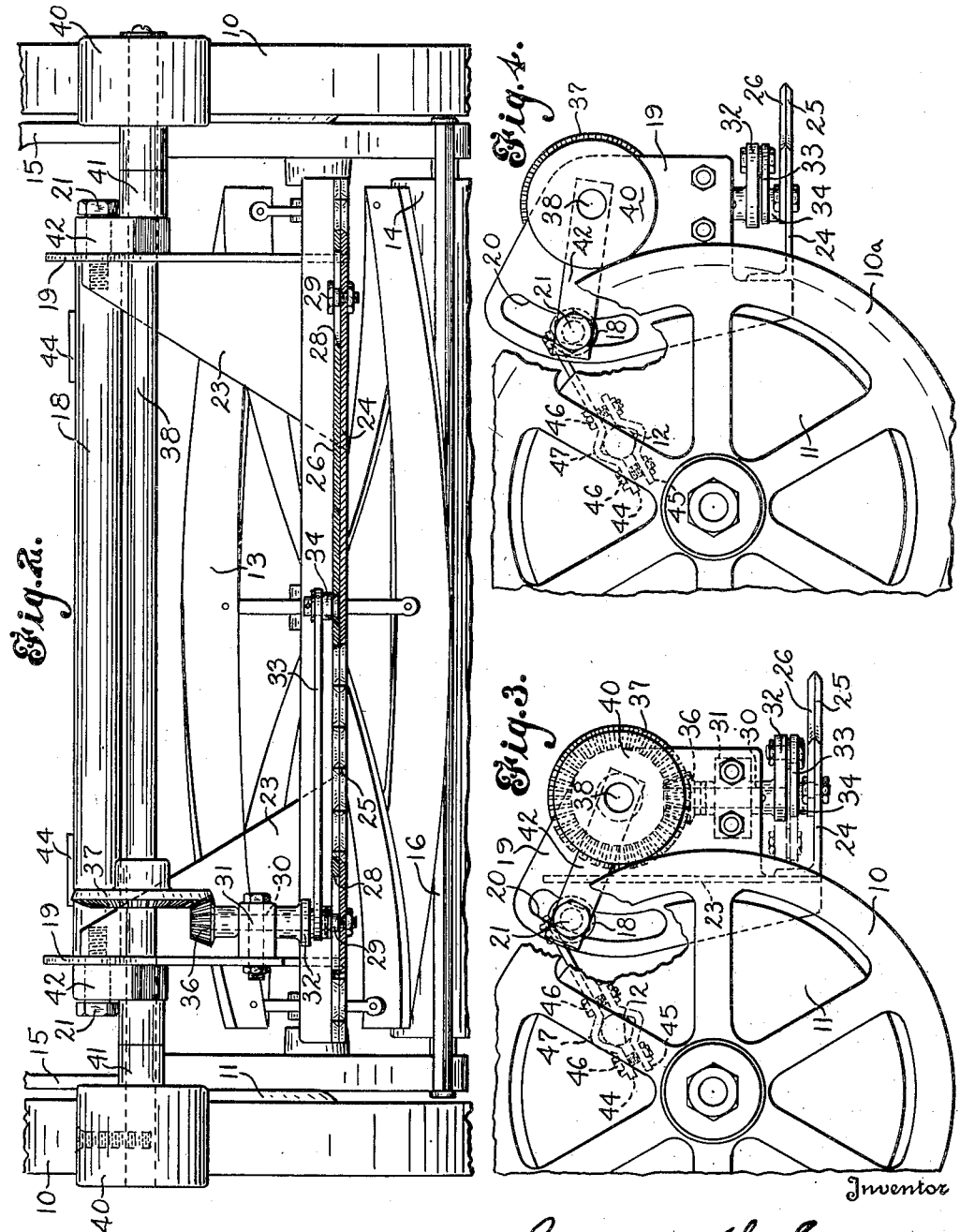
Inventor
George H. Spence
By Rockwell & Leichter
ATTORNEYS Patented Dec. 12, 1950

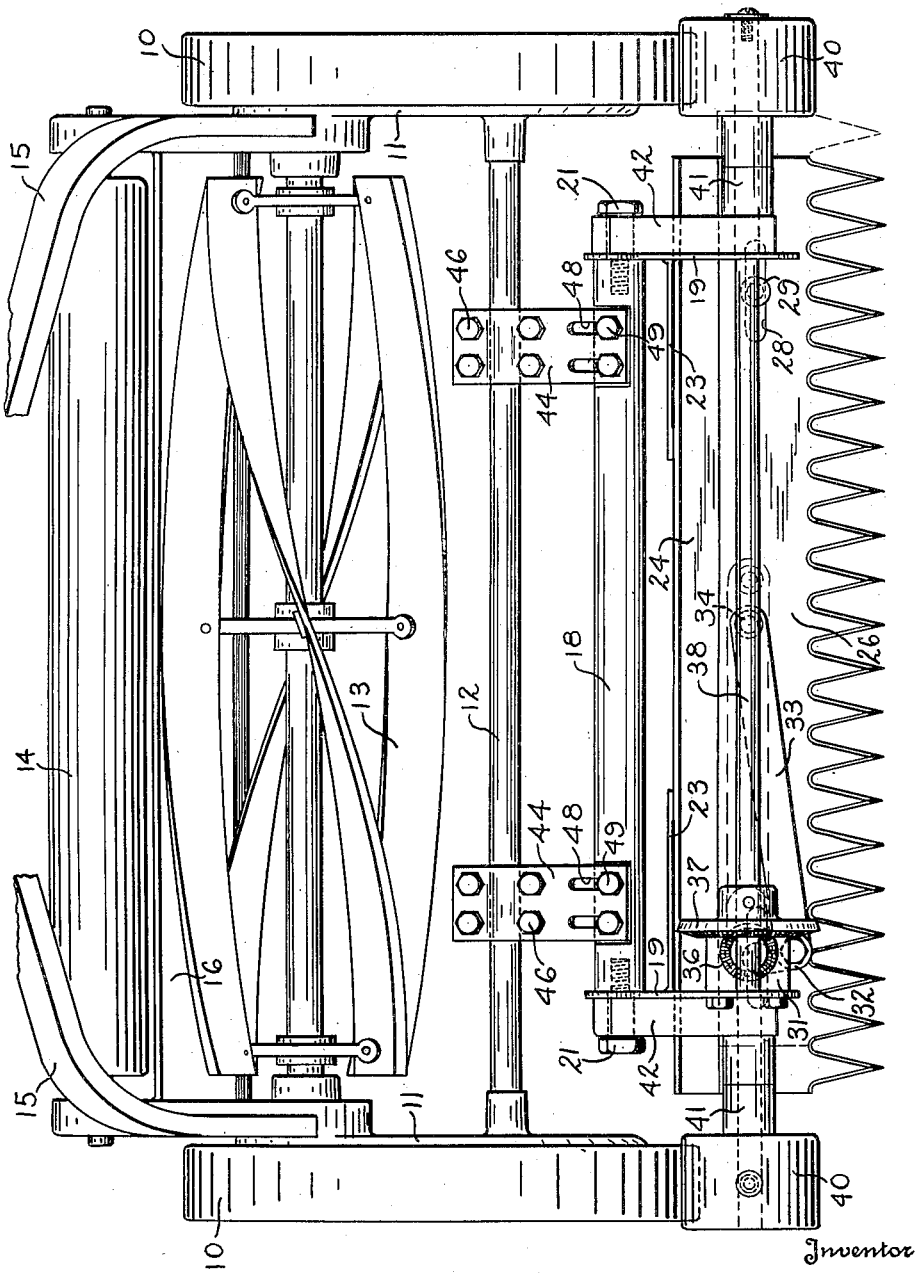

2,533,745

UNITED STATES PATENT OFFICE 2,533,745

ATTACHMENT FOR LAWN MOWERS

George H. Spence, New Haven, Conn., assignor to Harman Distributors, Inc., New Haven, Conn., a corporation of Connecticut Application November 5, 1948, Serial No. 58,523

8 Claims. (Cl. 56—238)

This invention relates to an attachment for lawn mowers and, more particularly, to a device for cutting the taller grasses or weeds which will usually not be satisfactorily cut by the usual cutting reel of the mower.

The usual lawn mower is provided with a rotatable reel provided with a plurality of cutting blades which operate in conjunction with a shear blade close to the surface of the ground. As is well known, it sometimes occurs that when it is attempted to cut tall grass or weeds these are not drawn into the mower reel to be sheared off between the cutter blades and the shear blade, and the mower passes over them after which they straighten up and give the lawn an untidy appearance. I contemplate by the present invention providing an attachment which may be readily secured to the ordinary lawn mower, which attachment will be provided with a reciprocating cutter bar and means for reciprocating this bar from the ground wheels of the mower, the cutter bar being arranged to shear off the taller grasses or weeds at such a height above the ground that the stubble which is left will be satisfactorily trimmed by the usual rotating reel of the mower.

Moreover, the attachment illustrated in the accompanying drawings is so constructed that it is simple to manufacture, easy to attach to the mower, and will operate satisfactorily with different mowers regardless of the size of the ground wheels, within limits.

One object of the present invention is to provide mechanism for cutting grasses or weeds, which mechanism may be readily attached to the usual lawn mower to operate in conjunction with the cutting reel of a mower.

Another object of the invention is to provide an attachment for lawn mowers which will serve to cut the tall grasses or weeds in advance of the usual cutting reel of the mower, and which may be readily attached to the mower frame in operative position notwithstanding the fact that the wheels of the mower may vary in size.

Still another object of the invention is to provide an attachment for lawn mowers which may be readily attached to the mower to cut the tall grasses or weeds in advance of the usual cutting reel of the mower, the attachment comprising a reciprocating cutting blade and reciprocating means for the blade, which means shall be operated from the ground wheels of the lawn mower.

To these and other ends the invention consists in the novel features and combinations of parts to be hereinafter described and claimed.

In the accompanying drawings:

Fig. 1 is a top plan view of a portion of a lawn mower having my attachment secured thereto;

Fig. 2 is a front elevational view of the parts shown in Fig. 1;

Fig. 3 is a partial side elevational view of the lawn mower showing my attachment; and Fig. 4 is a view similar to Fig. 3 showing the attachment applied to a mower having ground wheels larger than those shown in Fig. 3.

To illustrate a preferred embodiment of my invention, I have shown in Fig. 1 of the drawings a lawn mower of the usual type, the mower comprising ground wheels 10 rotatably mounted on a mower frame comprising two castings 11, adjacent the wheels, and a cross rod 12. The usual rotating reel of the mower is shown at 13, the ground roller at 14, and the handle yoke at 15. A shear blade is shown at 16 which, as is usual, cooperates with cutting reel 13. All of the above parts are normally found in the usual mower structure and may be of any preferred construction.

As illustrated in the drawings, my attachment comprises a frame member 18 extending longitudinally of the cutter bar, at each end of which is positioned a frame plate 19, these plates abutting against the ends of the member 18. Each plate is provided with an arcuate slot 20 and a shouldered screw 21 passes through the slot of each plate and is threaded in the corresponding end of the frame member, the shoulder on the screw abutting the end face of the latter.

Each of the plates 19 is provided with a laterally extending flange 23 of triangular shape, shown more especially in Figs. 2 and 3, and to the lower portions of these flanges is secured by welding or the like an L-shaped member, the horizontal body portion of which constitutes a ledger bar or finger bar 24 having forwardly projecting pointed fingers 25. Slidably mounted on the finger bar is a toothed cutter bar 26 adapted to reciprocate with respect to the finger bar. The cutter bar is provided with guide slots 28 and shouldered bolts 29 pass through these slots and the finger bar 24 to hold the cutter bar snugly against the finger bar, but to allow it to reciprocate.

A vertically disposed shaft 30 is mounted in a bearing block 31 secured to one of the frame plates 19, this shaft having a crank 32 at its lower end to which is pivoted one end of a pitman 33, the other end of the pitman being pivoted to the cutter bar at 34 so as to provide means for reciprocating the cutter bar.

To the upper end of the shaft 30 is secured a gear 36, the teeth of which are in mesh with a gear 37 secured to a shaft 38 rotatably mounted in the plates 19. The ends of the shaft 38 extend laterally beyond the plates and on these extended ends are secured rollers 40 which, as shown, are adapted to rest upon the ground wheels 10 of the lawn mower so that the shaft will be driven from these wheels. Spacing collars 41 may be placed on the shaft 38 to space the rollers from adjacent parts of the attachment. It will be apparent from Figs. 3 and 4 that the shaft 38 lies above the axis of the ground wheels and the attachment is so constructed that the weight of the attachment will hold the rollers 40 in frictional contact with the wheels to insure a proper driving relation between these elements.

Mounted on each of the bolts 21 on the outer side of the corresponding plate 19 is a link 42, which link is pivoted on the corresponding bolt and extends to the shaft 38, the latter passing rotatably through these links which serve to pivotally connect the attachment to the frame member 18. It will be understood that the shoulders at the inner ends of the bolts 21, which abut the end faces of the member 18, will prevent the binding of the links 42 so that the latter will swing freely about the frame member 18 to permit the attachment to seek its normal position by virtue of its weight with the rollers 40 in contact with the ground wheels, and with the cutter bar in a horizontal position.

It will be understood that the slots 20 receive the body portion of the bolts 21 somewhat freely so that the plate member 19 is free to move with respect to the frame member 18. The arcuate slots 20 are described about the shaft 38 as a center so that the attachment as a whole may move vertically with respect to the frame member 18, and at the same time the cutter bar will seek a horizontal position.

In order to secure the attachment to the frame of the mower, I have provided cooperating clamp members 44 and 45 which may be secured together by bolts 46, these clamp members being provided with opposed V-shaped portions 47 which embrace the cross rod 12 of the mower frame and are designed to be clamped rigidly thereto. The upper clamp members 44 extend forwardly from the cross rod 12, as shown in Figs. 1 and 3, and are provided with elongated slots 48 to receive bolts 49, these bolts being screwed into the frame member 18. This secures the frame member 18 rigidly in place, but allows its adjustment to and from the cross rod 12 by means of the slots 48, and also allows its adjustment pivotally about the cross rod 12 as the clamp members may be set at any desired angle.

As is well known, the ground wheels of lawn mowers are not all of the same size and my attachment will readily accommodate itself to mowers having wheels of different size. If necessary, the angle of the clamp members with the horizontal may be changed to suit the particular mower with which the attachment is desired to be used. In many instances, however, the slots 48 will provide sufficient adjustment.

Exact adjustment in this respect is not necessary for the adjustment provided by the pivotal hanging of the attachment on the frame member 18 and by the arcuate slots 20 will permit the attachment to seek its proper position with the rollers 40 in contact with the ground wheels 10 and, at the same time, the cutter bar will be in a horizontal position. For example, as shown in Figs. 3 and 4, the ground wheels 10$^a$ of the mower, shown in Fig. 4, are slightly larger than the ground wheels 10, shown in Fig. 3. The angle of the clamp member with respect to the cross rod 12 is the same in each figure, however, as is also the position of the rod 18 with respect to the clamp plates 44. Compensation is made for the difference in the size of the wheels by the adjustment of the position of the plates 19 with respect to the member 18. The plates 19 and the entire attachment carried thereby is supported at a higher position in Fig. 4 than in Fig. 3 yet in both positions the rollers are frictionally engaged with the ground wheels in proper driving relation and, at the same time, the cutter bar is substantially horizontal.

While I have shown and described a preferred embodiment of my invention, it will be understood that it is not to be limited to all of the details shown, but is capable of modification and variation within the spirit of the invention and within the scope of the claims.

What I claim is:

1. An attachment for lawn mowers having spaced wheels, a frame member adapted to extend transversely of the mower, a plate at each end of said member and supported thereby, means connecting each of said plates to the frame member a reciprocable cutter bar supported by said plates, reciprocating means for the cutter bar carried by one of said plates, a drive shaft rotatably mounted in said plates and connected to said reciprocating means, the ends of said shaft projecting through the plates and having rollers secured thereto, and means secured to said frame member and extending rearwardly therefrom for securing said attachment to the mower with the rollers frictionally engaged with said wheels.

2. An attachment for lawn mowers having spaced wheels, a frame member adapted to extend transversely of the mower, a plate at each end of said member and supported thereby, means connecting each of said plates to the frame member, a reciprocable cutter bar supported by said plates, reciprecting means for the cutter bar carried by one of said plates, a drive shaft rotatably mounted in said plates and connected to said reciprocating means, the ends of said shaft projecting through the plates and having rollers secured thereto, and means secured to said frame member and extending rearwardly therefrom for securing said attachment to the mower with the rollers frictionally engaged with said wheels above the plane of the wheel axes whereby said rollers are urged into contact with the wheels by the weight of the attachment.

3. An attachment for lawn mowers having spaced wheels, a frame member adapted to extend transversely of the mower, a plate at each end of said member and supported thereby, means connecting each of said plates to the frame member, a reciprocable cutter bar supported by said plates, reciprocating means for the cutter bar carried by one of said plates, a drive shaft rotatably mounted in said plates and connected to said reciprocating means, the ends of said shaft projecting through the plates and having rollers secured thereto, and means secured to said frame member and extending rearwardly therefrom for securing said attachment to the mower with the rollers frictionally engaged with said wheels, said plates being slotted for adjustable raising and lowering connection with said frame member.

4. An attachment for lawn mowers having spaced wheels, a frame member adapted to extend transversely of the mower, a plate at each end of said member, means connecting each of said plates to the frame member, a reciprocable cutter bar supported by said plates, reciprocating means for the cutter bar carried by one of said plates, a drive shaft rotatably mounted in said plates and connected to said reciprocating means, the ends of said shaft projecting through the plates and having rollers secured thereto, and means for securing said attachment to the mower with the rollers frictionally engaged with said wheels, said means connecting the plates to the frame member comprising a pair of links pivotally connected to the frame member and to the plates.

5. An attachment for lawn mowers having spaced wheels, a frame member adapted to extend transversely of the mower, a plate at each end of said member and supported thereby, means adjustably connecting each of said plates to the frame member, a reciprocable cutter bar supported by said plates, reciprocating means for the cutter bar carried by one of said plates, a drive shaft rotatably mounted in said plates and connected to said reciprocating means, the ends of said shaft projecting through the plates and having rollers secured thereto, and means secured to said frame member and projecting rearwardly therefrom for securing said attachment to the mower with the rollers frictionally engaged with said wheels.

6. An attachment for lawn mowers having spaced wheels, a frame member adapted to extend transversely of the mower, a plate at each end of said member, means connecting each of said plates to the frame member, a reciprocable cutter bar supported by said plates, a reciprocating means for the cutter bar carried by one of said plates, a drive shaft rotatably mounted in said plates and connected to said reciprocating means, the ends of said shaft projecting through the plates and having rollers secured thereto, means for securing said attachment to the mower with the rollers frictionally engaged with said wheels, and a link member pivoted to each end of the frame member and to said shaft.

7. An attachment for lawn mowers having spaced wheels, a frame member adapted to extend transversely of the mower, a plate at each end of said member, means connecting each of said plates to the frame member, a reciprocable cutter bar supported by said plates, reciprocating means for the cutter bar carried by one of said plates, a drive shaft rotatably mounted in said plates and connected to said reciprocating means, the ends of said shaft projecting through the plates and having rollers secured thereto, and means for securing said attachment to the mower with the rollers frictionally engaged with said wheels, said mower having a cross bar and said securing means comprising clamp members adjustably secured to the cross bar and secured to said frame member.

8. An attachment for a lawn mower having a frame including a cross bar and spaced wheels on said frame, a pair of clamp members secured to the cross bar and projecting forwardly therefrom, a frame member extending parallel to the cross bar and secured thereto by said clamp members, a link pivoted to said frame member at each end thereof, a shaft rotatably mounted in said links and extending outwardly therefrom, rollers on the extended ends of said shafts in frictional contact with the mower wheels, a frame plate at each end of said frame member, each of said plates having an arcuate slot therein for adjustable connection with the frame member and having an opening through which said shaft rotatably extends, a cutter bar carried by said plates, and reciprocating means supported on one of said plates and connected to said shaft and to said cutter bar.

GEORGE H. SPENCE.

REFERENCES CITED

The following references are of record in the file of this patent:

UNITED STATES PATENTS

| Number | Name | Date |
|---|---|---|
| 887,461 | Card | May 12, 1908 |
| 1,751,054 | Peel | Mar. 18, 1930 |
| 1,913,094 | Smath et al. | June 6, 1933 |
| 2,339,948 | Redd | Jan. 25, 1944 |